US012447806B2

(12) United States Patent
Wössner

(10) Patent No.: US 12,447,806 B2
(45) Date of Patent: Oct. 21, 2025

(54) ALL-ELECTRIC DRIVE UNIT FOR A VEHICLE, IN PARTICULAR A SELF-TRAVELLING WORKING MACHINE, AND METHOD FOR ITS OPERATION

(71) Applicant: MULAG Fahrzeugwerk Heinz Wössner GmbH u. Co. KG, Oppenau (DE)

(72) Inventor: Holger Wössner, Oberkirch (DE)

(73) Assignee: MULAG Fahrzeugwerk Heinz Wössner GmbH & Co. KG, Oppenau (DE)

( * ) Notice: Subject to any disclaimer, the term of this patent is extended or adjusted under 35 U.S.C. 154(b) by 617 days.

(21) Appl. No.: 17/431,519

(22) PCT Filed: Mar. 12, 2020

(86) PCT No.: PCT/EP2020/056607
§ 371 (c)(1),
(2) Date: Feb. 25, 2022

(87) PCT Pub. No.: WO2020/182933
PCT Pub. Date: Sep. 17, 2020

(65) Prior Publication Data
US 2022/0185086 A1 Jun. 16, 2022

(30) Foreign Application Priority Data

Mar. 12, 2019 (DE) .......................... 102019106294.2

(51) Int. Cl.
B60K 1/02 (2006.01)
B60K 17/04 (2006.01)
(Continued)

(52) U.S. Cl.
CPC ................ B60K 1/02 (2013.01); B60K 17/04 (2013.01); B60K 17/28 (2013.01); B60K 25/00 (2013.01);
(Continued)

(58) Field of Classification Search
CPC .......... B60K 1/02; B60K 17/04; B60K 17/28; B60K 25/00; B60K 2025/005;
(Continued)

(56) References Cited

U.S. PATENT DOCUMENTS

2015/0158484 A1* 6/2015 Sato ....................... B60K 6/445
180/65.265
2016/0237651 A1* 8/2016 Miyamoto .......... B60W 30/182
2020/0055391 A1 2/2020 Kumar et al.

FOREIGN PATENT DOCUMENTS

CN 206336116 U * 7/2017
CN 106241633 B * 8/2018 ............... B66D 5/28
(Continued)

Primary Examiner — Tinh Dang
(74) Attorney, Agent, or Firm — Head, Johnson, Kachigian & Wilkinson, PC

(57) ABSTRACT

In order to be able to supply the traction drive on the one hand and the working unit (210) on the other hand with the energy required in each case independently of one another in a purely electrically driven vehicle (200), in particular a self-travelling working machine (200), a fully electric drive unit (100) is provided which supplies both, with a planetary gear unit (1) which is driven by two separately controllable electric machines (E1, E2) and thus, considered on its own, acts as a summing gear.

Figure 1A:
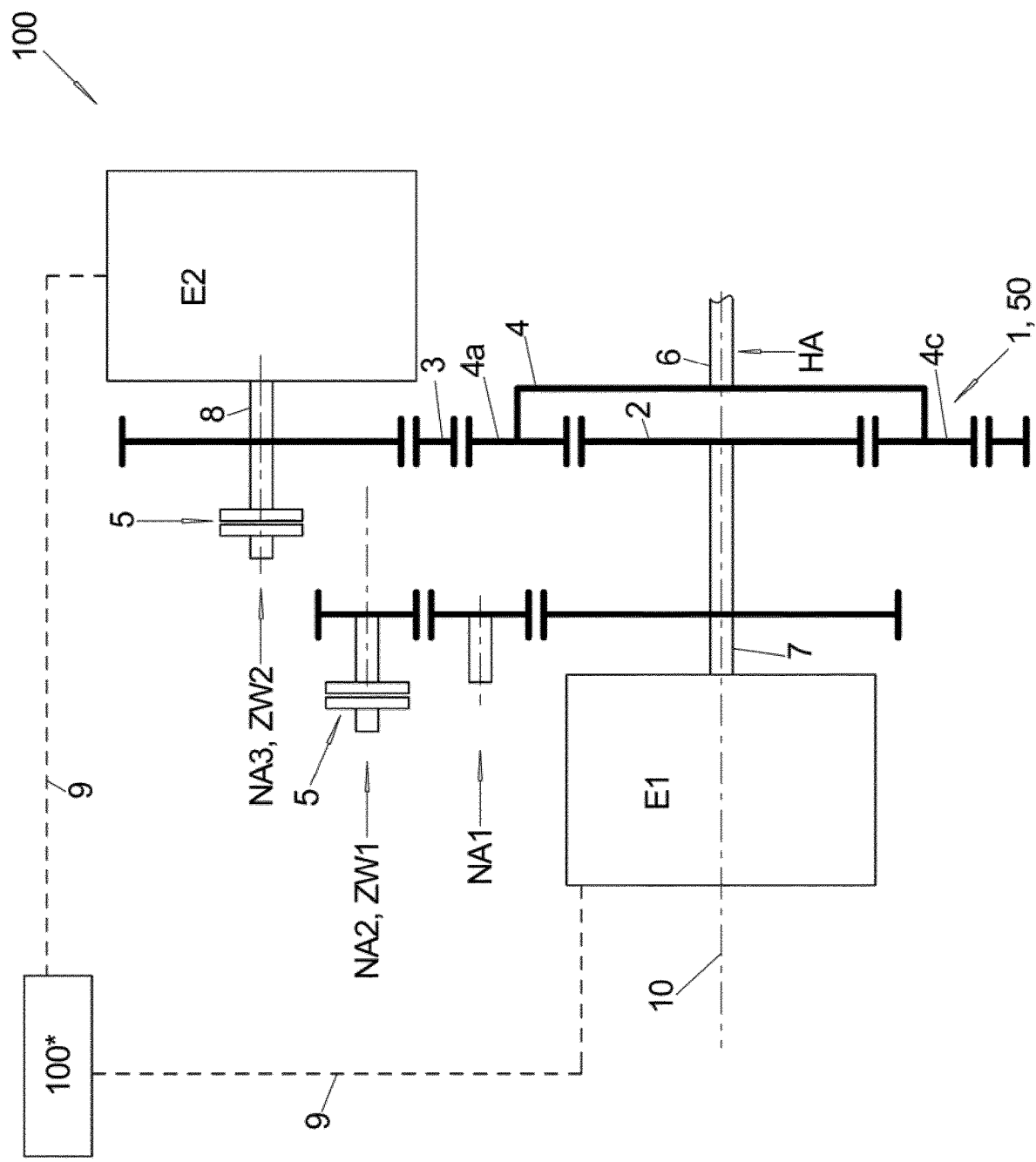

Because of an additional power output (NA1), which is coupled to one of the two E-machines (E1) and/or the corresponding drive input into the planetary gear (1) with a fixed transmission ratio, the working unit (210) can be supplied via this power output (NA1), while the speed of the traction drive is independently controlled via the differential (Continued)

speed between the sun gear (2) and the ring gear (3), which are driven by the two E-machines (E1, E2).
The sum of the planetary gear and the power output (NA1) thus acts primarily as a power divider gear.

11 Claims, 7 Drawing Sheets

(51) Int. Cl.
     *B60K 17/28*      (2006.01)
     *B60K 25/00*      (2006.01)
     *B60W 30/182*     (2020.01)
     *F16H 37/08*      (2006.01)

(52) U.S. Cl.
     CPC ....... *B60W 30/182* (2013.01); *F16H 37/0806* (2013.01); *B60K 2025/005* (2013.01)

(58) Field of Classification Search
     CPC ............. F16H 37/0806; B60W 30/182; B60Y 2200/141; B60Y 2200/22
     See application file for complete search history.

(56) References Cited

FOREIGN PATENT DOCUMENTS

| | | |
|---|---|---|
| DE | 102010031156 | 1/2012 |
| DE | 102016224092 | 6/2018 |
| JP | 2013141955 | 7/2013 |
| WO | WO2017063864 | 4/2017 |
| WO | WO2018156676 | 8/2018 |

\* cited by examiner

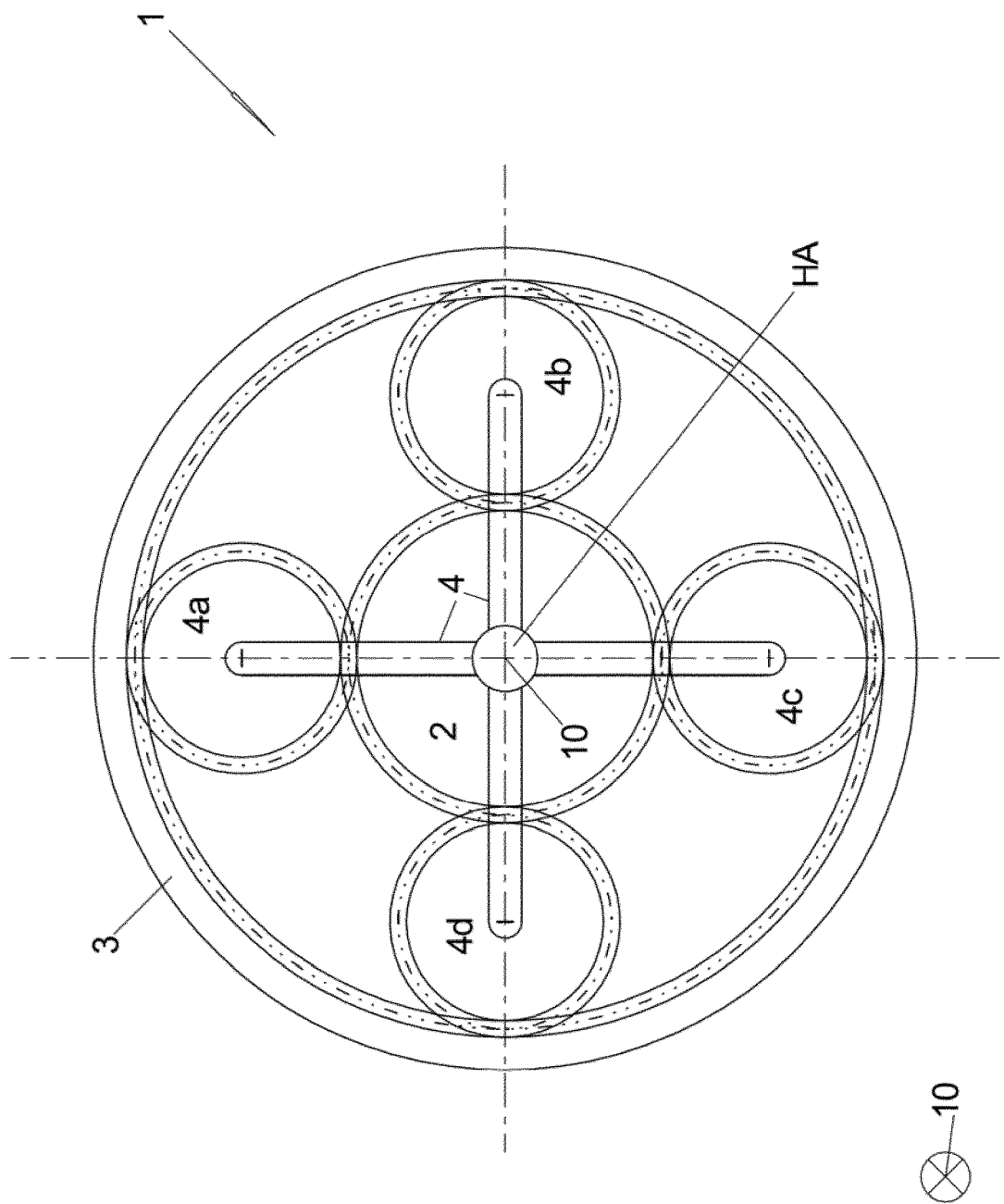

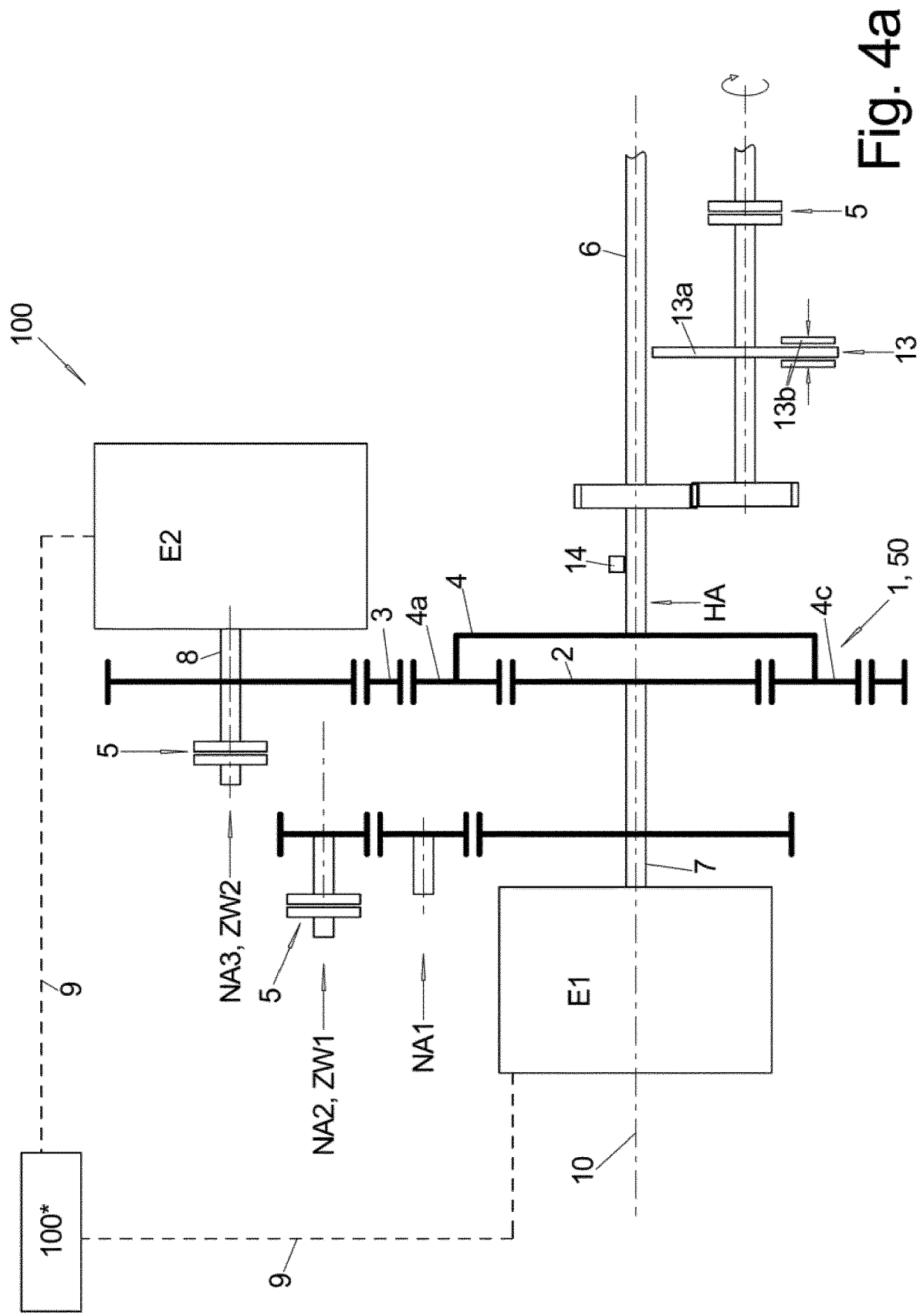

ALL-ELECTRIC DRIVE UNIT FOR A VEHICLE, IN PARTICULAR A SELF-TRAVELLING WORKING MACHINE, AND METHOD FOR ITS OPERATION

I. APPLICATION AREA

The invention relates to the all-electric drive of self-travelling working machines as well as vehicles with required very large gear spread.

II. TECHNICAL BACKGROUND

Self-propelled working machines are those in which a working unit can be mounted and dismounted on a carrier vehicle, in particular its chassis, such as a snow plow, or in which the working unit together with the carrier vehicle forms an integral self-propelled working machine, such as a self-propelled harvester-thresher.

In such a self-travelling working machine, the power requirement of the working unit need not have a fixed relationship with the travel speed of the carrier vehicle and the necessary power requirement therefor.

The working machine may include a tool, but this is not a condition for the definition as a working machine. Any power receiver on the carrier vehicle, such as a hydraulic unit, is also considered as a working unit for the purpose of the present invention.

Vehicles with a large gear spread are, for example, tractors or construction vehicles:

A tractor used in agricultural operations must be able to reduce the driving speed to 1 km/h or even below for certain operations, for example certain soil cultivation operations, whereas driving speeds of 80 km/h or even more are desirable when driving on public roads.

At the same time, it is precisely during such slow creep travel that the power requirement at the tractor's mechanical power output shafts or hydraulic connections for an associated working unit attached to the tractor can be particularly high.

In the case of self-travelling working machines, the problem of the often mutually independent power requirement of the working unit on the one hand and the travel drive of the carrier vehicle on the other has so far been solved by the fact that the only power generator present, the internal combustion engine, supplies the travel drive with torque via a hydraulic serial pump-motor combination (hydrostat), and the torque, i.e. the drive power, for the working unit is taken from the hydrostat via a power output and is thus independent of the speed/travel speed of the travel drive. In this context, the hydrostatic drive train can be provided in parallel with a fully mechanical drive train, so that the power flow optionally runs via one of the two drive trains, for example via the hydrostatic drive train when a mechanical transmission is to be shifted in the mechanical drive train.

From the international patent application WO 2017/063864 A1, a drive train for a self-travelling agricultural working machine is known, in which a main drive source in the form of an internal combustion engine brings power into the drive train, but with which continuously adjustable hydraulic motors, usually controllably connectable and disconnectable, can both bring power to the drive train and remove power from it, whereby the power can be removed from the drive train via various, connectable and disconnectable, power outputs.

If, on the other hand, a self-travelling working machine is to be driven exclusively electrically (all-electric drive), the internal combustion engine could be replaced by an electric motor, but the downstream hydraulic transmission in the form of the hydrostatic or hydraulic converter is still required.

In the case of pure transport vehicles, especially traction vehicles, with the required large gear spread of the travel drive, the independent power output is not required, and the hydrostat is used only to achieve the large speed spread, possibly in combination with an upstream or downstream mechanical transmission.

Planetary gears including a sun gear, a ring gear and a planet carrier, are further known for realising a large speed spread.

In this context, it should be noted that a planetary gear in the literal sense does not necessarily need to have a ring gear, i.e., a gear with teeth on its inner circumference, but there are designs in which instead of the ring gear, usually axially offset with respect thereto, there may be another gear with—instead or additionally—teeth on the outer circumference and/or on the end face as a component of the planetary gear.

For the purpose of the present application, however, it should be clarified that the term "ring gear" is not intended to imply such a restriction of planetary gears that the so-called ring gear must actually have teeth on its inner circumference.

In two-shaft operation, i.e., when one of these three elements is not rotatable or does not rotate, there may be a high fixed transmission ratio due solely to the geometrical design of these three elements relative to each other.

In three-shaft operation, i.e., when all of these three elements can rotate, a planetary gearbox can be
used as a splitter gearbox by driving one of the three elements and using the other two as output drives
or as a summing gearbox by driving two of the three elements and using the third as a single output to which the sum of the input powers of the two driven elements of the planetary gear is delivered.

The latter is used, for example, in hybrid vehicles to couple two drive sources—usually of different design—such as an internal combustion engine on the one hand and an electric motor on the other, in such a way that they can provide a proportion of drive that is variable in relation to each other, and to connect the output of the planetary gearbox to the driven axle of the vehicle.

In this context, DE 2016224092 A1 describes a powertrain for a motor vehicle in which the internal combustion engine and the E-machine are the two drive sources and the total torque of these two drive sources can be used at their output. A control device is used to set a desired rotational speed at the output based on the rotational speed of one of the two drive sources and the desired torques of the two drive sources.

However, the speed spread that can be achieved at the driven axis is limited.

III. PRESENTATION OF THE INVENTION a) Technical Object

It is therefore the object according to the present invention to provide an all-electric drive unit, in particular without hydraulic components in the drive unit itself, for a vehicle which offers a wide, preferably stepless, speed spread, in particular a ratio of more than 1:500, preferably more than 1:600 preferably more than 1:690 for its drive wheels and, in the case of a self-travelling working machine, provides a power supply or torque supply for the working unit which is independent of the speed of rotation or the travel speed of the travel drive, i.e. the driven wheels of the carrier vehicle.

b) Solution of the Object

This object is solved by the features of claims 1 and 9. Advantageous embodiments result from the subclaims.

An all-electric drive unit is understood to be one in which the required mechanical energy is provided exclusively by electric motors, irrespective of whether these are supplied with energy via batteries, via fuel cells or other sources.

In particular, E-machines are used as electric motors, which can be operated either as electric motors, i.e. as electric consumers, or as electric generators.

With regard to the all-electric drive unit, this object is solved in that it comprises
- at least two independently controllable electric machines as drive sources
- a power divider gearbox comprising
  - a planetary gear with the three rotatable main components sun gear, ring gear and planet carrier,
  - the two E-machines driving two of the three rotatable main components of the planetary gear,
  - at least one power output which is mechanically coupled to one of the two driven inputs of the planetary gear, i.e. for example to one of the electric machines, preferably in a fixed transmission ratio, it preferably also being possible to cancel the coupling, i.e. to deactivate it.

Due to this constellation, the speed at the power output is not freely selectable, but depends on the speed at the corresponding input of the planetary gear with which the power output is coupled, i.e. the electric machine coupled there. However, the speed of the main output, i.e. the output of the planetary gear, can be freely selected, since it depends on the relation of the speeds at the two inputs of the planetary gear.

Thus, if the power output requires a certain speed of the e-machine coupled to it in fixed ratio, the speed can still be varied at the output of the planetary gear by controlling the speed of the second electric machine in relation to the speed of the first electric machine. The direction of rotation at the output of the planetary gear can also be selected in this way.

Preferably, therefore, the output of the more powerful e-machine is greater than that of the less powerful e-machine by a maximum of 500%, preferably only by a maximum of 300%, so that both e-machines can also have the same output. If the power is different, the more powerful e-machine is preferably coupled to the input of the planetary gear at which the power output is located.

The power split gearbox should preferably be embodied so that the maximum speed of the faster of the planetary carrier on the one hand and the power output on the other is at most 500%, preferably only by at most 300%, higher than that of the slower of the two.

Preferably, one electric motor is coupled to the sun gear and the other electric motor is coupled to the ring gear, i.e. actively connected, so that even very low speeds, including standstill of the planet carrier, can be easily realized on the planet carrier, even with the sun gear and ring gear rotating.

In this way, hydraulic components can be completely unnecessary in such a drive unit, especially within the travel drive.

Preferably, a control system, in particular an electronic control system, is provided which controls the drive unit according to the target specifications entered by the operator for the drive unit or according to request signals supplied by connected components, in particular the two drive sources, in particular the two e-machines, independently of one another, in which case the direction of rotation, speed and torque of each of the two e-machines are freely adjustable, Depending on the application, a power divider gearbox, in particular a differential, can also be coupled to the planet carrier in order to distribute the speed and power output to this output of the planetary gear in a targeted manner.

Similarly, power outputs can also be operatively connected to one of the existing at least two drive sources, in particular electric machines, but preferably in each case in a fixed speed ratio, in particular in a rotationally fixed manner.

For a compact design of the drive unit, the two drive sources, in particular e-machines, can be arranged axis-parallel, in particular coaxially one behind the other or even one inside the other, in which case the planetary gear is preferably arranged on the end face and centrally of one of the two e-machines.

In particular, the drive unit is an all-electric drive unit in the sense that the drive sources for its power divider gear are exclusively E-machines and, in particular, the control for the drive unit is an electric, especially electronic, control. The energy for the E-machines and the control can be provided by a battery, a power generator such as a fuel cell or via other types of electrical energy supply.

In addition, a clutch and/or a brake can be provided in an output train, in particular only one output, especially the main output:

By means of the brake, the corresponding output, which is braked anyway by the consumer driven by it, can be additionally braked.

A conventional brake such as a disc brake can be used as a brake, whereby the braking energy taken off is not used but is lost as waste heat, or a consumer, in particular an equipment part of the working unit driven by the drive unit, can also be used.

Whether the brake or the clutch is located further downstream in this output train, in particular the main output, with respect to the drive unit, in particular the planetary gear, depends on the intended use.

The clutch and brake can be arranged coaxially one behind the other.

Likewise, it is left open whether the brake and/or the clutch are located directly on the corresponding output drive, or in a secondary drive train parallel thereto, which is coupled to the output drive train, in particular mechanically coupled, preferably in a fixed speed ratio, With regard to a fully electrically driven vehicle, in particular a self-travelling working machine, the object is solved in that the drive unit present in this vehicle—which in the case of a self-travelling working machine also drives the working unit of this self-travelling working machine—is a fully electric drive unit, in particular as described above.

Preferably, the planet carrier is operatively connected to the drive wheels of the vehicle, in particular via an intermediate differential, while—in the case of a self-travelling working machine—the secondary, minor, power output is operatively connected to the working unit of the self-propelled working machine.

As a result, the travel speed and direction of the carrier vehicle can be controlled essentially independently of the instantaneous power requirements of the working unit.

In this context, the power split gear together with the axle beam or the drive stud for the driven wheels can form a firmly interconnected, jointly manageable assembly, by whose installation in a chassis a corresponding vehicle, in particular a self-travelling working machine, can be created very quickly.

With regard to the control method for a self-travelling working machine, in particular its all-electric drive unit, which drives both the carrier vehicle and the working unit, the existing object is solved differently depending on the primary momentary use—operating the working unit or driving the carrier vehicle quickly:

Primary use means that the other respective intended use can certainly exist and also be carried out in parallel, but the largest proportion of the total power currently used is used for the primary intended use.

If primarily the working unit is to be operated, i.e. driven by the all-electric drive unit, but the desired driving speed of the carrier vehicle is relatively low or even zero, i.e. requires little power—as in the case of a snow blower or harvester-threscher in use, for example—
- on the one hand, the sun gear and ring gear, which are each driven by one of the two e-machines, are driven in opposite directions, so that this difference in speed determines the speed of the planet carrier and thus the speed of the drive wheels of the carrier vehicle, which can thus be very low and can also be zero,
- on the other hand, the E-machine coupled to the power output is operated at such a speed that the power output provides the desired speed and/or power to the working unit driven thereby. The speed of the other e-machine is selected in relation to the first-mentioned e-machine so that the desired differential speed is achieved in the planetary gear.

If, on the other hand, the primary focus is on driving, in particular fast driving of the carrier vehicle, for which high power is generally required at high driving speeds, while high torque is required at low driving speeds, while the working unit is deactivated, i.e. does not need to be driven,
- on the one hand, the sun gear and ring gear are driven in the same direction of rotation, so that the higher of these two speeds determines the speed of the planet carrier and thus the speed of the drive wheels of the carrier vehicle, which can thus be very high,
- on the other hand, the working unit is decoupled from the power output.

If, for example, the sun gear and ring gear are driven at the same speed and in the same direction of rotation, this is also the speed and direction of rotation of the planet carrier, since the individual planet gears are then stationary with respect to their own axis of rotation and do not perform any relative movement to the sun gear and ring gear.

If, for example, the ring gear rotates slightly faster than the sun gear, but in the same direction of rotation, the speed of the planet carrier is between that of the sun gear and ring gear, but has the same direction of rotation as these two wheels of the planetary gear.

If the vehicle is to start from a standstill, both electric motors can preferably be driven simultaneously, but in the same direction of rotation.

For a particularly slow start, for example because of a very high torque required for this, both E-machines are preferably set in rotation in opposite directions, preferably at the same rotational speed, as a result of which the planet carrier starts moving only at a differential speed, in particular initially standing still.

By slightly increasing the speed of one electric motor and slightly decreasing the speed of the other electric motor, a low speed is then achieved—starting from a stationary planet carrier—combined with a high torque at the planet carrier. This makes it possible to realize high drive torques when starting or at slow driving speeds of the vehicle's drive wheels coupled to the planet carrier.

The procedure for starting up and also for driving the carrier vehicle at high speed can also be used for a vehicle that does not have a working unit but, for example, because of a high weight or for other reasons, requires a high torque when starting up and whose speed is to be controlled very precisely.

A first special case is the transition from a low to a high driving speed of the vehicle:

First, starting from the opposite direction of rotation of the two E-machines, their differential speed is increased, which can also be done from a differential speed=zero and then corresponds to a start-up of the vehicle.

The differential speed is increased in such a way that the speed of one of the two e-machines is reduced to zero and switched over to the opposite direction of rotation, and the speed of this e-machine is increased in this other direction of rotation, this direction of rotation after switching over corresponding to the direction of rotation which causes the desired direction of travel of the vehicle.

Preferably, when the speed of one electric motor is lowered, the increase in power of the other e-machine is higher, so that the vehicle nevertheless becomes faster. Also during the change of the direction of rotation of the one E-machine the speed of the other E-machine is further increased, so that there is neither an interrupted acceleration of the vehicle, in particular carrier vehicle and in particular not a temporary deceleration of the vehicle.

A second special case is the control for a reversing operation of the vehicle, i.e. the alternating forward and reverse driving of the vehicle:

In the case of unequal directions of rotation of the sun gear and ring gear, i.e. in particular of the two electric machines coupled to them, the direction of rotation of the planet carrier and thus of the drive wheels of the vehicle depends on which of the two speeds of the sun gear and planet gear is the higher.

Thus, alternate forward and reverse driving of the vehicle can be effected by changing—without changing the direction of rotation of the sun gear or ring gear as well as the electric machines coupled therewith—their speeds in such a way that alternately one or the other wheel has the higher speed, whereby this change causes a reversal of the driving direction of the vehicle in each case.

This prevents the stop of one of the electric machines and thus also the relatively low power in the lowest speed range of an electric machine.

In the drive unit described, at least one of the two electric machines can be used—in particular independently of the operating state of the drive unit—as a generator for recuperating electrical energy, for example as an electric brake, for example when energy is introduced into the planetary gearbox, such as the planet carrier, by the drive wheels of the vehicle when driving downhill, for example, or energy is introduced into the planetary gearbox by a power output from a driven machine.

EXAMPLES OF EMBODIMENTS

Figure 1B:
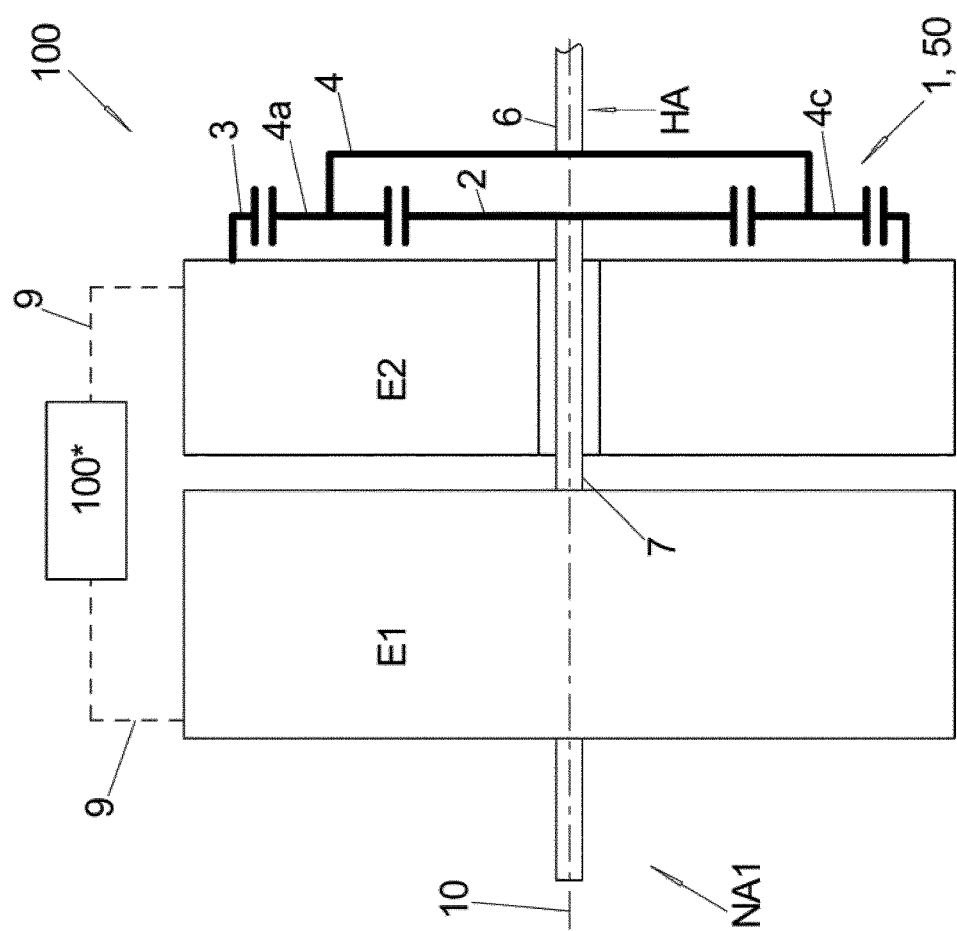
Figure 2:
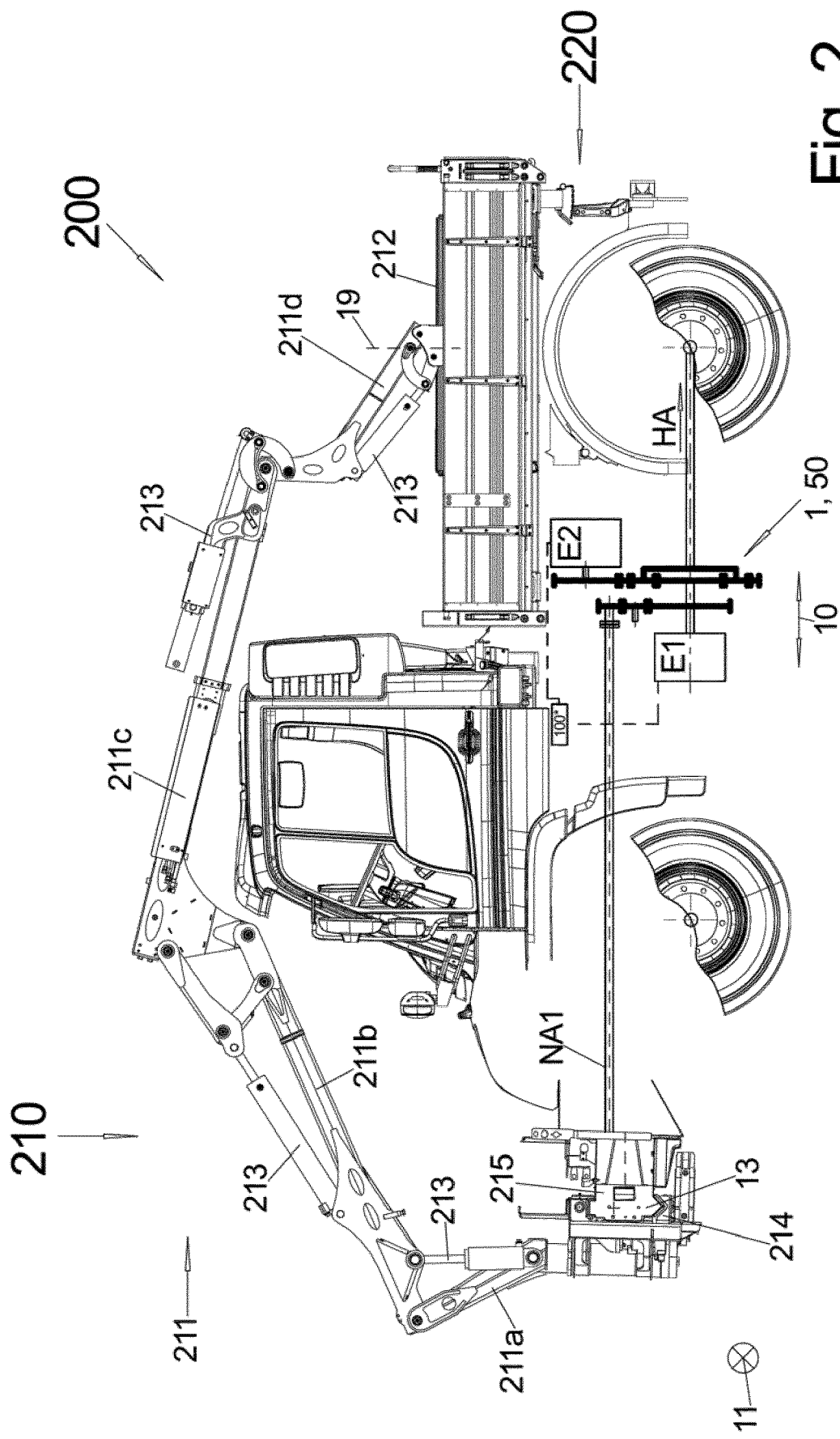

Embodiments according to the invention are described in more detail below by way of example. They show:

FIG. 1a, b: two designs of the drive unit,

FIG. 1c: an axial view of the planetary gear shown in FIG. 1a,

FIG. 2: a self-propelled working unit with the drive unit from FIG. 1*a-c*, FIG. 3: a drive axle assembly with the drive unit of FIGS. 1*a-c*, FIG. 4*a, b*: supplemented variants of the embodiment shown in FIG. 1*a*.

1*b* shows a side view of a first embodiment of the drive unit 100 according to the invention consisting of a power split gearbox 50-in the form of a classic planetary gear unit 1 and at least one first secondary output drive NA1-and two E-machines E1, E2 arranged axially parallel to each other as drive sources, which in normal operation drive on the one hand the sun gear 2 by means of a shaft 7 and on the other hand the ring gear 3 of the planetary gear 1 by means of a shaft 8, while the planet carrier 4 of the planetary gear 1 serves as the main output drive HA in the form of a shaft 6 fixed thereto for rotation.

The secondary output drive NA1 is coupled to the axle 7, which is non-rotatably connected to the sun gear 2, and/or to the first electric machine E1, which is connected to it, in a fixed speed ratio.

In addition, in this case, another secondary output drive NA2 is provided directly or indirectly on the axle 7—which is coupled in a rotationally fixed manner to the rotor of the E-machine E1—which is also coupled to the E-machine E1 in a fixed speed ratio, which in this case can be, for example, a PTO-shaft ZW1.

Likewise, another secondary output drive NA3 may be coupled in a fixed speed ratio with axle 8 and/or the first E-machine E2 connected to it.

Each of the secondary output drives may be separable from the planetary gear 1 via a clutch 5, as shown in this case only on the secondary output drives NA2 and NA3.

In particular, the view of the planetary gear 1 in axial direction 10—the axis of rotation of the sun gear 2—according to FIG. 1*c* makes clear that this is a classic planetary gear, in which the internally toothed ring gear 3 is arranged concentrically to the externally toothed sun gear 2 and both are in mesh via the planet gears 4*a* to d, in this case four, which are mounted rotatably about their axes of rotation on a planet carrier 4, which is operatively connected to the axle 6, in particular non-rotatably connected.

Both electric machines E1, E2 are connected to the control 100\* via signal lines 9.

FIG. 1*a* shows in the same view as FIG. 1*b* a 2nd embodiment of the drive unit 100 according to the invention, which differs from the 1st embodiment essentially in that it is a coaxial arrangement of the two E-machines E1, E2, in which the axle 7, which connects the sun gear 2 to the E-machine E1, extends through the hollow center of the E-machine E2, which is located in the axial direction 10 between the E-machine E1 and the planetary gear 50. The E-machine E2 is non-rotatably connected to the ring gear 3 by connecting elements 8.

In order to achieve a simple compact design, in this 2nd embodiment the two E-machines E1 and 2 are arranged on one end face of the planetary gear 50, preferably on the side of the planetary gear 50 opposite the main output drive HA of the planetary gear 50.

In the first embodiment according to FIG. 1*b*, on the other hand, the two E-machines E1, E2 are arranged on opposite end faces of the planetary gear 1, axially parallel to each other, so that the axle 7, which connects the planetary gear 1, in particular its sun gear 2, to the E-machine E1, and the axle 8, which couples the E-machine E2 to the planetary gear uit 50, run parallel to each other. In this case, the axle 8 is connected in a rotationally fixed manner to a gear whose external teeth mesh with external teeth additionally present on the ring gear 3.

Figure 4B:
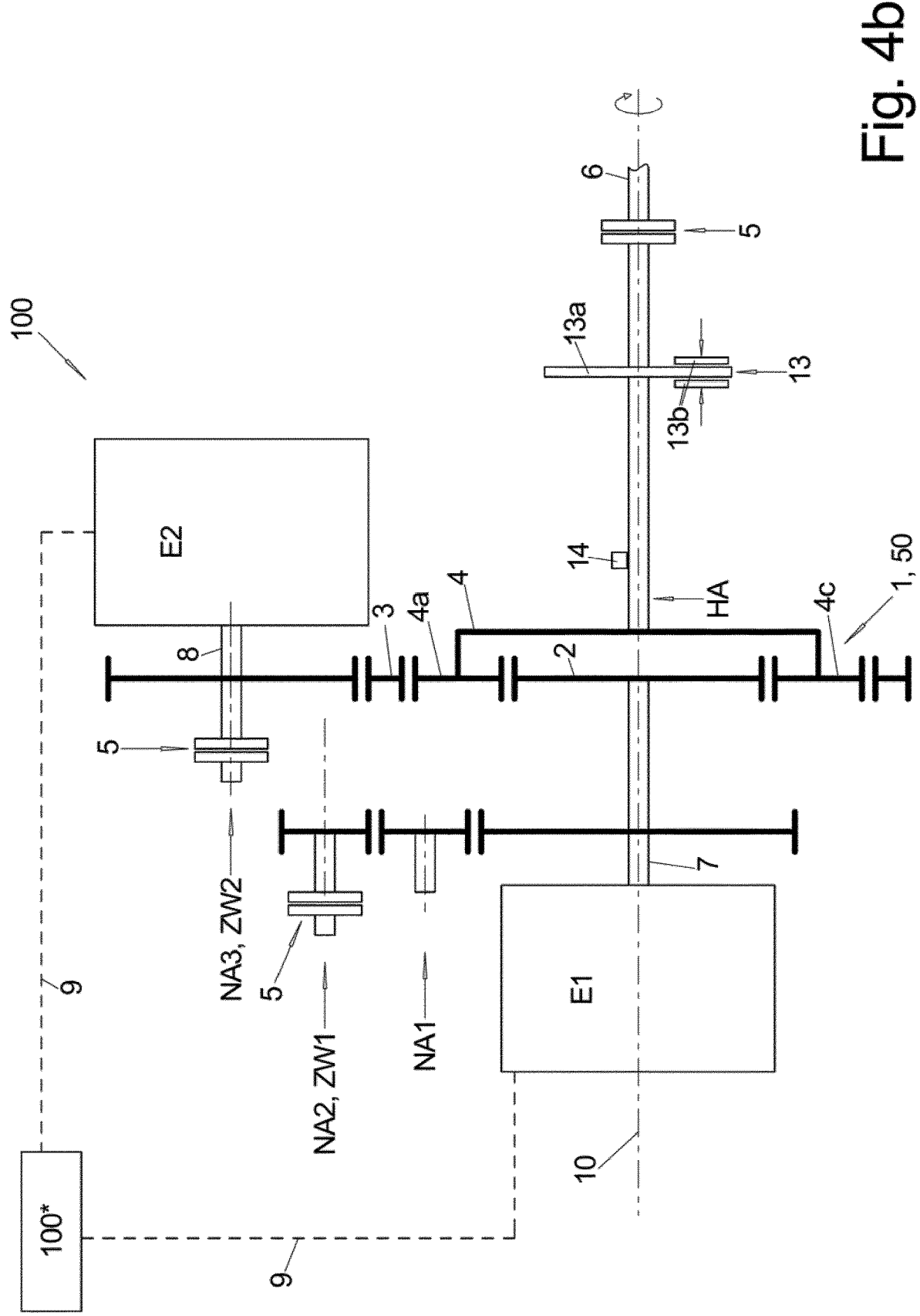

FIGS. 4*a, b* show a supplemental equipment on the main output drive 6 of the embodiment according to FIG. 1*b*, whereby this supplemented equipment on the main output drive 6 can also be present on any other embodiment of the drive unit according to the invention, in particular the planetary gear according to the invention:

According to FIG. 4*b*, in the output drive downstream of the main output drive HA in its axle 6, on the one hand, a brake 13 is arranged, i.e. non-rotatably connected to this axle 6, and downstream thereof a clutch 5 is arranged in this output drive.

The main output drive HA can be additionally braked by the brake 13—in this case embodiied as a conventional disc brake with a brake disc 13*a* coupled in a rotationally fixed manner to the main output drive HA, i.e. the output shaft 6, against which brake shoes 13*b* can be pressed in the axial direction on both sides.

By means of the clutch 5, energy consumers driven by the main output drive HA can be completely decoupled from the latter.

The clutch 5 can instead and/or additionally be arranged upstream of the brake 13 in order to be able to uncouple the brake from the main output drive HA of the power divider gear.

In the case of the embodiment according to FIG. 4*a*, the same applies, in particular functionally, as explained for FIG. 4*a*, but here the brake 13 and clutch 5 are arranged in a separate auxiliary drive of the main output drive 6, which is coupled to the main output drive HA at a fixed speed ratio via a gear connection.

In both cases, a torque sensor 14 can be present at the main output drive HA, which can measure the torque and thus the power taken at this output.

Thus, even if such a torque sensor 14 is present only at this main output drive HA or only at one of the auxiliary output drives, the power distribution to all outputs within the drive unit can be determined by the control 100\*.

FIG. 2 shows the drive unit 100 of FIG. 1*a* installed in a self-travelling working machine 200:

Here, the main output drive HA in the form of the axle 6 is operatively connected to the driven rear axle or the two driven axles of the carrier vehicle 220 via a respective power divider gear VG, while the secondary output drive NA1 is coupled to the working unit 210 mounted on the carrier vehicle 220, in particular releasably coupled by means of a clutch not shown here.

The working unit 210 in this case is a boom working unit in the form of a cantilever mower. The cantilever arm 211, which comprises a plurality of arm parts 211*a* to 211*d* connected to one another in an articulated manner, is attached on the vehicle side to a guide shoe 214, which can be moved in a controlled manner in the horizontal transverse direction 11 along a guide rail 215 attached in front of the front end of the carrier vehicle 220.

The working head 212—here a mowing head 212 for mowing the vegetation next to the edge of the roadway of roads—is attached to the free end of the cantilever arm facing away from the vehicle 211, which in this embodiment is in its storage position on the loading area of the carrier vehicle 220 behind its driver's cab, i.e. in its transport position.

The arm parts 211*a* to 211*d* can be adjusted in their mutual angular position in a controlled manner by means of length-adjustable, in particular telescopic, actuating elements arranged therebetween, in this case hydraulically or electrically operable, working cylinder units 213, which are each fastened with one of their ends to one of the arm parts and with their other end directly or indirectly to the next arm part, in each case away from the pivot joints therebetween, so that by changing the length of the actuating elements the intermediate angle between the arm parts can be changed.

By pivoting the vehicle-side end of the cantilever arm 211 about a vertical pivot axis relative to the guide shoe 214, the working group 212 can be brought into the desired position, usually laterally next to or laterally in front of the carrier vehicle 220 in working use.

By means of the drive unit 100 according to the invention, the travel speed of the carrier vehicle 220 can be controlled independently of the power delivered to the working unit 210 via the secondary output drive NA1 by controlling the speed and thus power of the two E-machines E1, E2.

Figure 3:
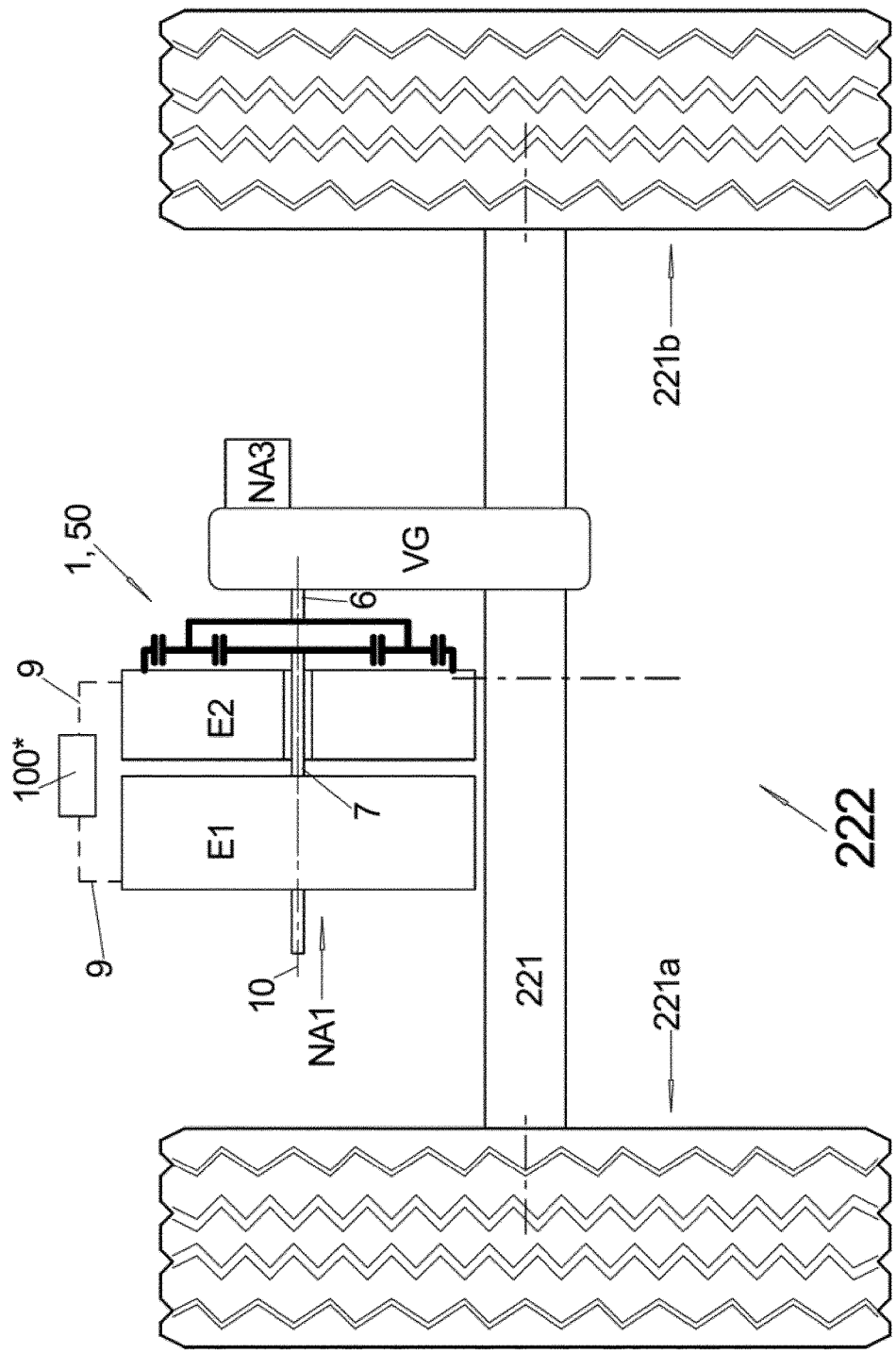

For the simplified construction of a self-travelling working machine 200, FIG. 3 shows how the drive unit 100 according to the invention, together with a power divider gear VG coupled to the shaft 6 of the main power output drive HA, which on the other hand is operatively connected to the driven axle 221, can form a ready-made drive axle assembly 222 which can be handled together and which, during assembly of the carrier vehicle 220, need only be inserted and fixed in its chassis.

LIST OF REFERENCES planetary gear
2 sun gear
3 ring gear
4 planet carrier
4a-d planet gear
5 clutch
6 axle
7 axle
8 connecting element
9 signal line
10 axial direction, axis of rotation
11 1. transverse direction
12 2nd transverse direction
13 brake
13a brake disk
13b brake shoe
14 power sensor, torque sensor
50 power split gearbox
100 drive unit
100* control
200 self-travelling working machine
210 working unit, cantilever mower
211 cantilever arm
211a-d arm part
212 working head, mowing head
213 working cylinder unit
214 guide shoe
215 front rail
220 carrier vehicle
221 drive axle
221a, b driven wheel
222 drive axle assembly
E1, E2 e-machine
HA main output drive
NA1, /2, /3 secondary output drive
VG power divider gear
ZW1, ZW2 power output shaft, PTO-shaft

The invention claimed is:

1. An all-electric drive unit (100) for a self-travelling working machine (200) with a carrier vehicle (220) and a working unit (210) integrated or demountably arranged thereon, wherein the drive unit (100) comprises:
    a power split gearbox (50) with
    a planetary gear (1) with rotatable elements including sun gear (2), ring gear (3) and planet carrier (4),
    wherein one of these three rotatable elements can be used as the main output of the planetary gear (1), and wherein the planet carrier (4) is operatively connectable to drive wheels (221a, b) of the carrier vehicle (220),
    two E-machines (E1, E2) as drive sources, each of which is operatively connected to one of the other two of the said three rotatable elements (2, 3, 4) of the planetary gear (1) and is capable of driving the latter,
    a control (100*) capable of centrally controlling the two E-machines (E1, E2) drive sources independently of each other, characterized by
    wherein the maximum power of the more powerful E-machine (e.g. E1) is greater than that of the less powerful E-machine (e.g. E2) by a maximum of 500%, and,
    at least one auxiliary power output (NA1) is adapted to be operatively connected to the working unit (210) and is operatively connected to one of the two E-machines (E1 or E2), in a fixed transmission ratio.

2. The drive unit according to claim 1, characterized in that
    the maximum speed of the faster of the planet carrier on the one hand and of the auxiliary power output on the other hand is at most 500%, or at most 300%, higher than that of the slower of the two, or
    the maximum speed of the planet carrier on the one hand and of the auxiliary power output is the same.

3. The drive unit according to claim 1, characterized in that
    one E-machine (E1, E2) is operatively connected to the sun gear (2) and the other E-machine (E2, E1) is operatively connected to the ring gear (3), or
    the two E-machines (E1, E2) can be switched over in the direction of rotation.

4. The drive unit according to claim 1, characterized in that
    the power output (NA1) is a power output shaft (ZW1), and/or
    the power output (NA1) can be uncoupled via a clutch (5).

5. The drive unit according to claim 1, characterized in that
    the two E-machines (E1, E2) are arranged axially parallel, concentrically to one another.

6. The drive unit according to claim 5, characterized in that
    the planetary gear unit (1) at one of the two E-machines end faces of the two E-machines and/or
    the E-machine (E1 or E2) further away from the planetary gear (1) is operatively connected to the auxiliary power output (NA1).

7. The drive unit according to claim 1, characterized in that
    a torque detector (14) is arranged on at least one of the output drives (HA, NA1, NA2, NA3), or only on one output drive, or only on the main output drive (HA,), and/or
    the planet carrier (4) is operatively connected to a power divider gear (VG).

8. The drive unit according to claim 1, characterized in that
with the main output (HA,), arranged coaxially or in parallel,
a clutch (5), and/or
a brake (13) is operatively connected, and
the working unit (210) or one of its energy-consuming sub-units during operation is used as brake (13).

9. A self-travelling working machine (200), characterized in that
the drive unit of the self-travelling working machine (200) is an all-electric drive unit (100) according to claim 1.

10. The machine according to claim 9, characterized in that
the planet carrier (4) is operatively connected to the drive wheels (222a, b) of a carrier vehicle (220).

11. The machine according to claim 9 characterized in that
the driven axle (221) together with the all-electric drive unit (100) is an integrated, jointly manageable, drive axle assembly (222).

\* \* \* \* \*